(12) United States Patent
Daverman

(10) Patent No.: US 7,683,994 B2
(45) Date of Patent: Mar. 23, 2010

(54) ELECTRODE MASK SHORTED TO A COMMON ELECTRODE

(75) Inventor: Dodge D. Daverman, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 278 days.

(21) Appl. No.: 11/529,834

(22) Filed: Sep. 29, 2006

(65) Prior Publication Data

US 2008/0079881 A1    Apr. 3, 2008

(51) Int. Cl.
*G02F 1/1343* (2006.01)
*G02F 1/136* (2006.01)

(52) U.S. Cl. .............................. 349/139; 349/46; 349/47

(58) Field of Classification Search .................. 349/123, 349/129, 139, 155, 38, 39, 46, 47, 140, 149, 349/151
See application file for complete search history.

(56) References Cited

U.S. PATENT DOCUMENTS

| | | | |
|---|---|---|---|
| 6,313,898 B1 * | 11/2001 | Numano et al. ............. | 349/129 |
| 6,847,355 B1 * | 1/2005 | Nishikawa et al. .......... | 345/173 |
| 7,142,260 B2 * | 11/2006 | Yang ............................ | 349/38 |
| 7,375,789 B2 * | 5/2008 | Mizuyoshi ................... | 349/155 |
| 2001/0004108 A1 * | 6/2001 | Iwamatsu et al. ........ | 252/299.7 |
| 2006/0238667 A1 * | 10/2006 | Lee et al. ...................... | 349/43 |

* cited by examiner

*Primary Examiner*—Tina M Wong
*Assistant Examiner*—Rhonda S Peace
(74) *Attorney, Agent, or Firm*—Nathan O. Greene; Brinks Hofer Gilson & Lione

(57) ABSTRACT

A liquid crystal display device with a liquid crystal material layer (414) includes a common electrode layer (406) proximate the liquid crystal material layer (414), a patterned metal oxide layer (408) arranged opposite the common electrode layer (406), where the liquid crystal material layer (414) is arranged between the common electrode layer (406) and the patterned metal oxide layer (408). The liquid crystal display device includes a thin, optically clear insulating coating (410) applied to a surface of the patterned metal oxide (408), and a patterned metal oxide mask (412) applied to a surface of the optically clear dielectric coating (410), where the patterned metal oxide mask (412) is electrically coupled to the common electrode layer (406). The liquid crystal display device controls where the electrical field is seen by the liquid crystal material by creating intentional shorts across it where it is not intended to switch.

24 Claims, 6 Drawing Sheets

ELECTRODE MASK SHORTED TO A COMMON ELECTRODE

BACKGROUND

The invention relates to liquid crystal display electrodes. In particular, the invention relates to a more manufacturable electrode construction.

Alternating layers of patterned thin conductors and dielectrics are widely used in the semiconductor industry. Some electroluminescent (EL) displays use a multilayer patterned rear electrode with a common front electrode construction.

Some Polymer Dispersed Liquid Crystal (PDLC) displays use a roll to roll process in the manufacture of display products. The instability of plastic substrates can make registering front and rear electrodes difficult in a roll to roll process. Current manufacturing equipment may have difficulty registering front and rear electrodes. As a result, conventional displays typically use a patterned rear electrode and a non-patterned common front electrode construction. The traces of the patterned electrode that run the signal to the segment apply an electric field across the liquid crystal that may cause the liquid crystal material above these traces to "clear." Some manufacturers may cover these traces with an ink overlay. This ink overlay, however, may be considered unacceptable.

BRIEF DESCRIPTION OF THE DRAWINGS

Embodiments of the present invention are now described, by way of example only, with reference to the accompanying figures in which.

DETAILED DESCRIPTION

Figure 1:
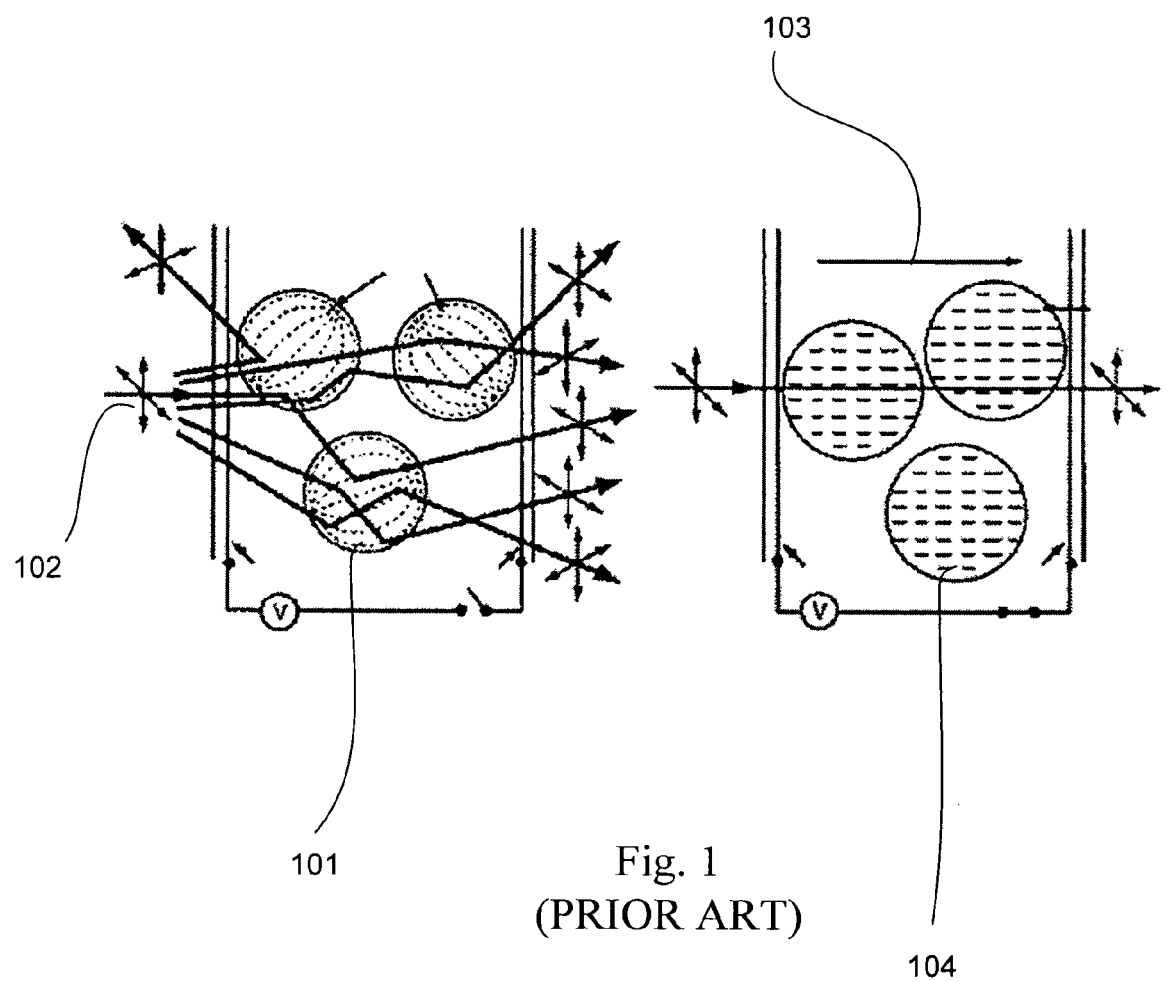
FIG. 1 illustrates a block diagram of a prior art PDLC arrangement.

The present disclosure is defined by the appended claims. This description summarizes some aspects of the present embodiments and should not be used to limit the claims.

While the present disclosure may be embodied in various forms, there are shown in the drawings and will hereinafter be described some exemplary and non-limiting embodiments, with the understanding that the present disclosure is to be considered an exemplification of the disclosure and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a and an" object is intended to denote also one of a possible plurality of such objects.

To prevent the electrode traces from clearing (that is, displaying in a viewing plane), an electric field needs to be restricted from being applied across the liquid crystal material in the areas where the liquid crystal material is not desired to switch. A common electrode is added, hereafter referred to as the ITO mask, on top of the patterned electrode on the rear substrate of the display. The rear substrate then carries the patterned ITO electrode, a thin coated dielectric, and the patterned ITO mask. The ITO mask is shorted to the common electrode which resides on the other side of the liquid crystal material. Since the ITO mask and the common electrode carry the same signal, no electric field is applied across the liquid crystal material. The ITO mask is patterned in such a way that it covers the entire display area except for the areas that the PDLC is supposed to switch. These areas are left as voids. In these voids, the electric field is applied across the dielectric and the PDLC material. Electrically, this looks like two capacitors placed in series. The smaller of the two capacitors sees the larger voltage drop. If the capacitance of the PDLC material is much smaller than the capacitance of the dielectric, then the PDLC will see the majority of the electric field. Because the PDLC sees an electric field in these areas, it switches clear.

FIG. 1 illustrates a schematic block diagram of a PDLC layer in a display. In a PDLC display, very small bubbles of liquid crystal are produced inside a transparent polymer. If no field is applied, these bubbles of liquid crystal 101 will randomly take on many different orientations. Since at least one of the two indices of refraction of the liquid crystal and the index of refraction of the polymer must differ, there will be some reflection of incoming light 102. When an electric field 103 is applied, the direction of the liquid crystal 104 will align with the field. If the materials are controlled so that the index of refraction of the liquid crystal for light polarized perpendicular to the director matches the index of refraction of the polymer, then light will propagate all the way through the material without being reflected at the bubbles.

Figure 2:
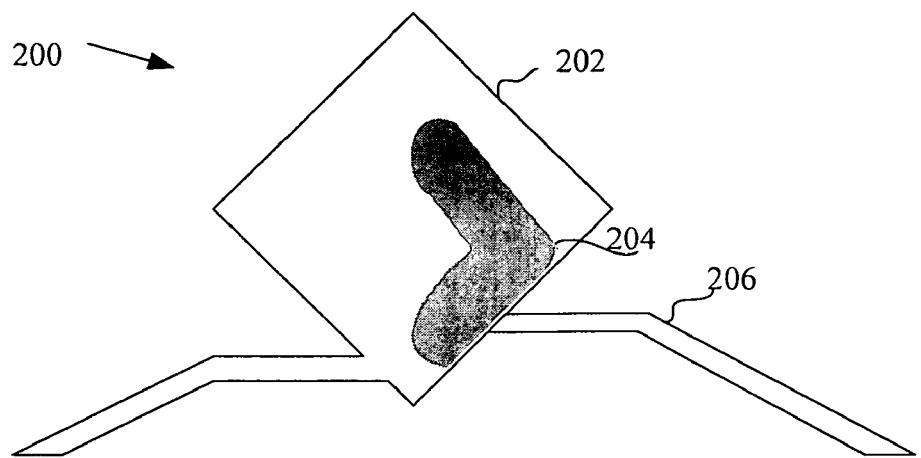
FIG. 2 illustrates a schematic block diagram of a liquid crystal display device electrode configuration.

FIG. 2 illustrates an example front and rear registered electrode construction 200 for a liquid crystal display device. In FIG. 2, the front electrode 202 is arranged before the liquid crystal material 204. The rear electrode 206 is arranged opposite the front electrode 202, so that the liquid crystal material 204 is arranged between the front electrode 202 and the rear electrode 206. Conventional processes may use a roll to roll coating and lamination process in manufacturing the plastic substrate displays. The instability of plastic substrates may make registering front electrode 202 and rear electrode 206 difficult in a roll to roll manufacturing process. The roll to roll process may not allow the use of a front and rear registered electrode construction 200.

Figure 3:
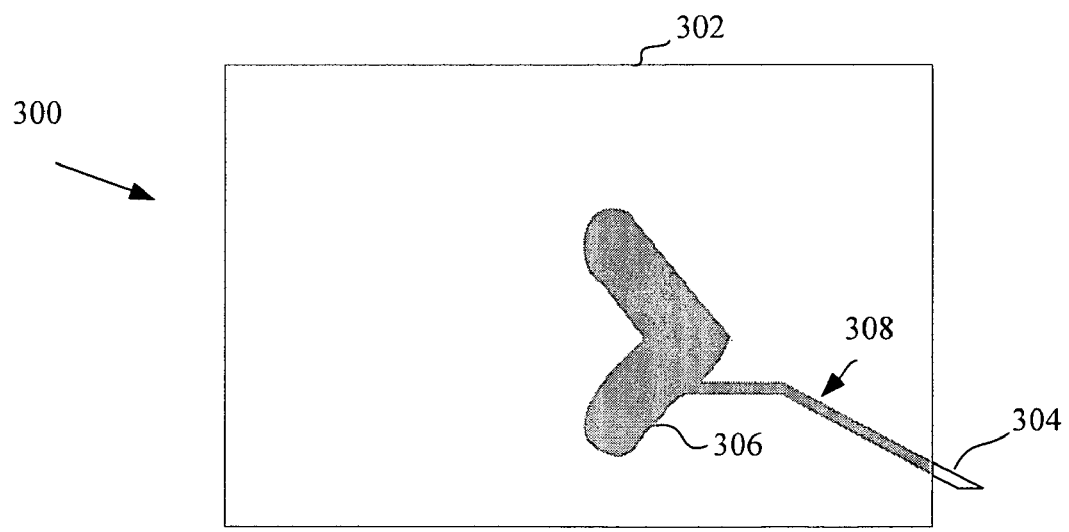
FIG. 3 illustrates a prior art electrode configuration.

FIG. 3 illustrates a conventional single-patterned electrode configuration 300. A conventional process uses a single patterned electrode plus a common electrode construction that applies an electric field to the liquid crystal material between the traces and common electrode. A segment 306 that "shutters" is defined by the intersection of the front electrode 302 and rear electrode 304 in the viewing plane. The conventional configuration 300 may cause unintended "shuttering," such as displaying the traces clearing 308, when only the icon display 306 is desired.

Figure 4:
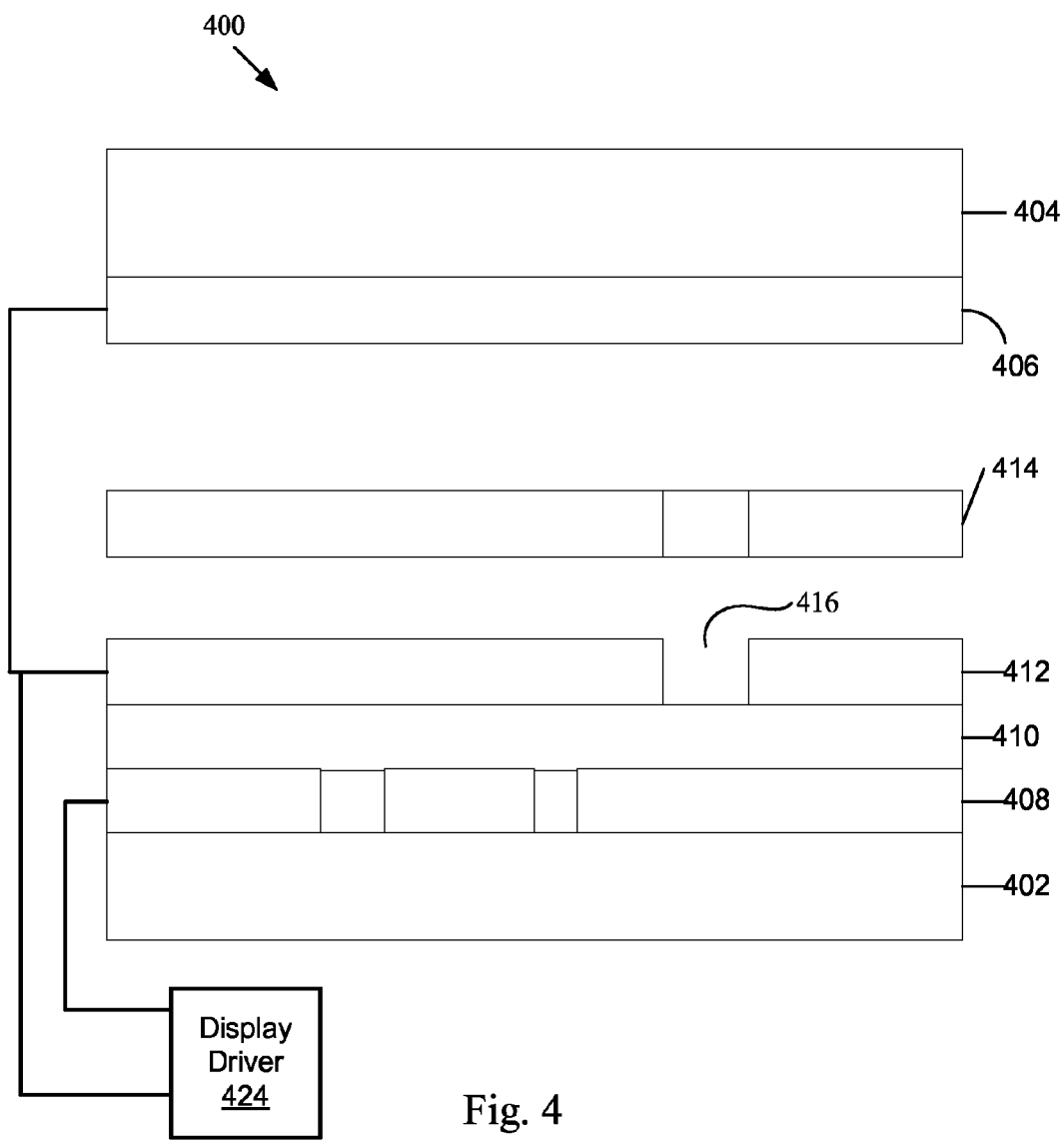
FIG. 4 illustrates an exemplary liquid crystal display device.

FIG. 4 illustrates a preferred embodiment of a liquid crystal display device 400. A rear substrate 402 and a front substrate 404 are formed. The rear substrate 402 and the front substrate 404 may be formed from polyethylene terephthelate (PET) or other similar polymer materials, glass, non-transparent materials, or other suitable substrate materials. The rear substrate 402 and the front substrate 404 may be deposited and then formed by laser cutting at a later process step. A common electrode layer 406 is formed, such as by sputtering, on a surface of the front substrate 404. The common electrode layer 406 is formed proximate a liquid crystal material layer 414 which is formed after the completion of the liquid crystal display device 400. The common electrode layer 406 forms one electrode from which an electric field is applied across the liquid crystal material 414.

A patterned metal oxide layer 408 is arranged opposite the common electrode layer 406, where the liquid crystal material layer 414 is arranged between the common electrode layer 406 and the patterned metal oxide layer 408. The patterned metal oxide layer 408 serves as the other electrode from which the electric field is applied across the liquid crystal material 414. The patterned metal oxide layer 408 is composed of indium tin oxide (ITO).

In a preferred embodiment, the liquid crystal display device 400 includes a thin, optically clear dielectric insulating coating 410 applied to a surface of the patterned metal oxide 408. The optically clear dielectric insulating coating 410 has an index of refraction substantially similar to an index of refraction of ITO, or approximately 1.71 for the visible light range. The optically clear dielectric coating 410 may be composed of titanium dioxide ($TiO_2$) or other optically clear coating materials.

A patterned metal oxide mask 412 is applied to a surface of the optically clear dielectric coating 410. The patterned metal oxide mask 412 is composed of ITO. The dielectric coating 410 serves to electrically insulate the patterned metal oxide layer 408 from the patterned metal oxide mask 412. In a preferred embodiment, the patterned metal oxide mask 412 is electrically coupled, such as electrically shorted, to the common electrode layer 406. In another exemplary embodiment, the patterned metal oxide mask 412 may be shorted to the common electrode layer 406 when the rear substrate 402 and the front substrate 404 are formed with a laser cutting process.

In a preferred embodiment, the patterned metal oxide mask 412 includes a plurality of void regions 416 that the liquid crystal material 414 shutters during an operation of the liquid crystal display device 400. The plurality of void regions 416 form icon shapes in the liquid crystal material 414. During the operation of the liquid crystal display device 400, the liquid crystal material 414 "shutters" substantially within the icon shapes. The patterned metal oxide mask 412 may be patterned so that the ITO material is formed everywhere except where the liquid crystal material 414 is intended to shutter. Icons or other symbols desired for display may be formed such that substantially only the desired icons or symbols are visible in a viewing plane during operation, and traces are substantially eliminated.

Figure 5:
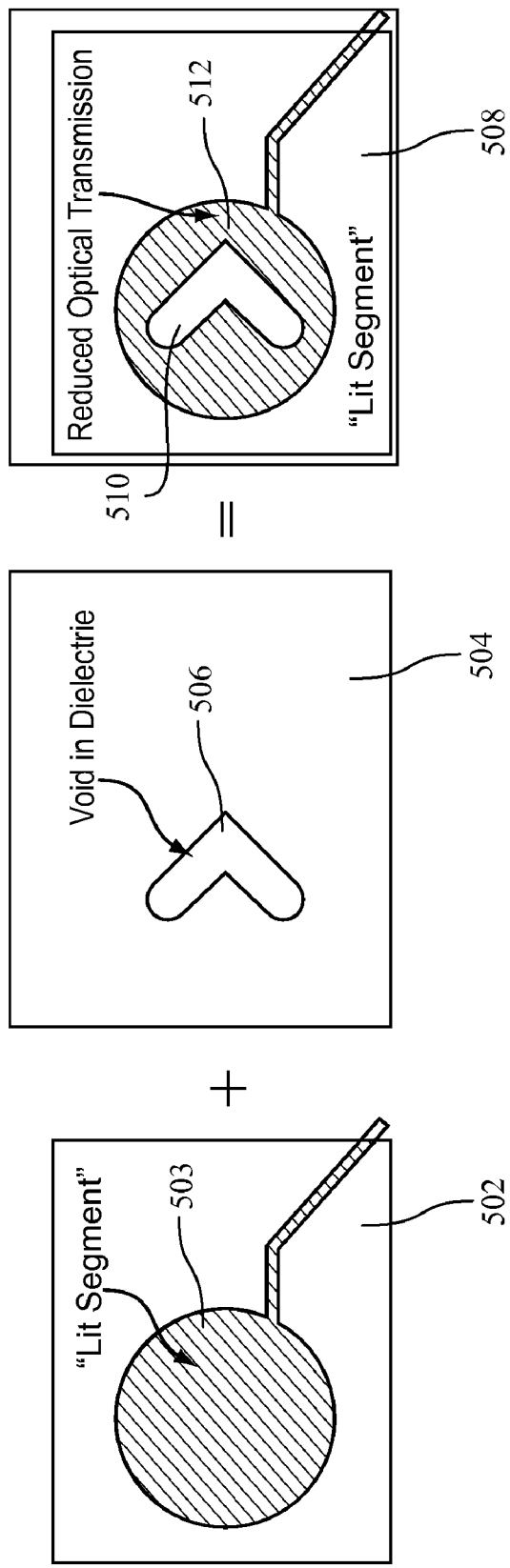
FIG. 5 illustrates a view of a liquid crystal display device.

FIG. 5 illustrates an exemplary liquid crystal display device seen from a viewing plane. A common front electrode and patterned rear electrode construction 502 includes a lit segment 503. The lit segment illustrates a portion of liquid crystal material that is displayed when an electric field is applied across the liquid crystal material using the electrodes. A portion of the patterned metal oxide mask 504 includes a void 506 in the patterned metal oxide mask 412. The void 506 may represent an icon or symbol for display in the viewing plane. In an exemplary embodiment, when the common front and patterned rear electrode construction 502 is combined with the portion of the patterned metal oxide mask 504 during display operation, the lit segment 503 provides a display of the icon or symbol represented by the void 506. Other portions of the common front and patterned rear electrode construction 502 provide a reduced optical transmission area. In this manner, substantially only the desired icon or symbol is displayed, and undesirable portions, such as cleared traces, have substantially diminished visibility.

Figure 6:
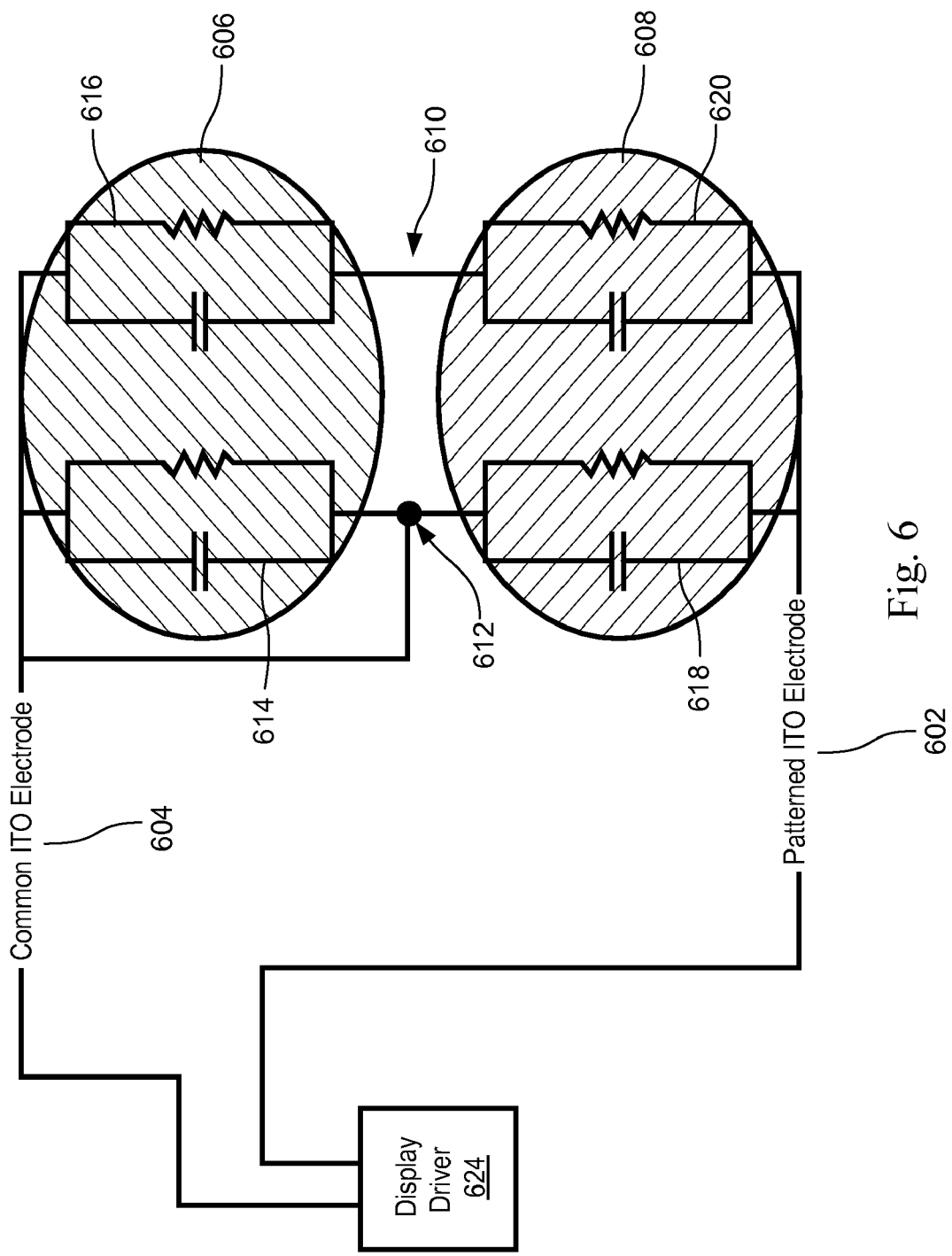
FIG. 6 illustrates a schematic electrical diagram of a liquid crystal display device.

FIG. 6 illustrates a schematic electrical block diagram of a liquid crystal display device. An electric field may be applied between a patterned ITO electrode 602 and common electrode 604. The liquid crystal material 606 as well as a dielectric coating material 608 may be modeled electrically as a capacitor (614 or 618) and a resistor (616 or 620) in parallel. The resistor (616 or 620) models a leakage current in the device and may be quite large. By connecting the ITO mask 612 to the common electrode 604, the liquid crystal material 606 has substantially no electric field and therefore does not shutter. Where there are voids in this ITO mask 612, the dielectric 608 and liquid crystal materials 606 act as capacitors (614 or 618) placed in series. The smaller of these two capacitors has the larger voltage drop. Using a thin coating of a dielectric 608 that has a large dielectric constant may leave most of the voltage drop across the liquid crystal material in the areas where the ITO mask 612 has a void.

Figure 7:
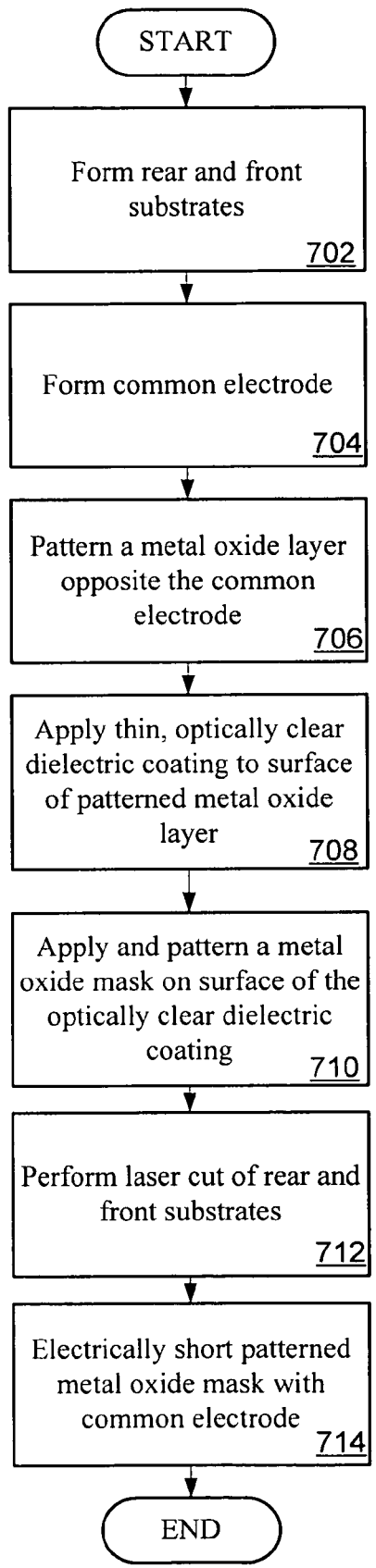
FIG. 7 illustrates an example process that forms a liquid crystal display device.

FIG. 7 illustrates a process that forms a liquid crystal display device. A rear substrate 402 and a front substrate 404 are formed, at step 702. The rear substrate 202 and the front substrate 204 may be composed of PET. A common electrode 406 is formed, at step 704. The common electrode 406 is formed proximate the front substrate 404 on a surface of the front substrate proximate liquid crystal material 414. A metal oxide layer 408, such as an ITO electrode, is patterned opposite the common electrode 406, at step 706. The ITO electrode is applied to a surface of the rear substrate 402. The liquid crystal material 414 is then arranged substantially between the common electrode 406 and the ITO electrode.

A thin, optically clear dielectric insulating coating 410 is applied to a surface of the ITO electrode, at step 708. The optically clear dielectric insulating coating 410 may be deposited with an index of refraction that is substantially equal to an index of refraction of ITO. The dielectric coating index of refraction may be substantially equal to 1.71 for wavelengths of light in the visible range.

A metal oxide mask 412, such as an ITO mask, is deposited and patterned, at step 710. The patterned metal oxide mask 412 is patterned to include a plurality of void regions 416 that the liquid crystal material 414 shutters during an operation of the liquid crystal display device 400. The plurality of void regions 416 form icon shapes. During the operation of the liquid crystal display device 400, the liquid crystal material 414 "shutters" substantially within the icon shapes. The patterned metal oxide mask 412 may be patterned so that the ITO material is formed everywhere except where the liquid crystal material 414 is intended to shutter. Icons or other symbols desired for display may be formed such that substantially only the desired icons or symbols are visible in a viewing plane during operation, and traces are substantially eliminated.

A laser cutting of the rear substrate 402 and the front substrate 404 may be performed, at step 712. The patterned ITO mask is electrically coupled to the common electrode 406, such as by electrically shorting the two layers, at step 714. In an exemplary embodiment, the patterned ITO mask may be shorted to the common electrode 406 during the laser cutting of step 712. Liquid crystal material 414 may be arranged within the liquid crystal device, such as by injecting the liquid crystal material 414 between the common electrode 406 and the patterned ITO mask. In other exemplary embodiments, a process coats PDLC onto the common substrate before laminating the common and rear substrate together. A laser cutting process may then be performed to cut the display after the lamination process.

The liquid crystal display device 400 controls where the electrical field is seen by the liquid crystal material by creating intentional shorts across it where it is not intended to switch, The liquid crystal display device 400 may solve critical cosmetic problems that would otherwise prevent a PDLC solution from being implemented. The display device 400 may provide an inexpensive solution to solving the "traces clearing" problem seen in some current segmented displays because it eliminates the need for a second patterned electrode and does not require additional manufacturing equipment for roll to roll registration. The liquid crystal display device 400 may be used in liquid crystal displays such as electroluminescent (EL) displays, electrofluorescent (EF) displays, and organoluminescent (OLED) displays. The liquid crystal display device 400 may be configured with a display driver 424, 624 to supply display signals to the patterned metal oxide layer 408, or patterned ITO electrode 602, and to the common electrode layer 404, 604, to form an LCD display. The LCD may be used in a mobile phone, a personal digital assistant (PDA), a mobile computer, or other mobile electronic devices.

While the principles of the invention have been described above in connection with specific apparatus, it is to be clearly understood that this description is made only by way of example and not as a limitation on the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A liquid crystal display device, including a liquid crystal material layer, the liquid crystal display device comprising:
   a common electrode layer proximate the liquid crystal material layer;
   a patterned metal oxide layer arranged opposite the common electrode layer, where the liquid crystal material layer is arranged between the common electrode layer and the patterned metal oxide layer;
   a thin, optically clear dielectric insulating coating applied to a surface of the patterned metal oxide layer; and
   a patterned metal oxide mask applied to a surface of the optically clear dielectric insulating coating, where the patterned metal oxide mask is electrically connected to the common electrode layer, wherein void regions are formed through the patterned metal oxide mask within which the liquid crystal material substantially shutters during an operation of the liquid crystal display device.

2. The liquid crystal display device of claim 1, where the patterned metal oxide layer comprises an indium tin oxide layer.

3. The liquid crystal display device of claim 1, where the optically clear dielectric insulating coating has an index of refraction substantially similar to an index of refraction of indium tin oxide.

4. The liquid crystal display device of claim 1, further comprising a rear substrate coupled with the patterned metal oxide layer, and a front substrate coupled with the common electrode layer.

5. The liquid crystal display device of claim 4, where the rear substrate and the front substrate comprise polyethylene terephthalate.

6. The liquid crystal display device of claim 4, where the patterned metal oxide mask is electrically connected to the common electrode between the rear substrate and the front substrate.

7. The liquid crystal display device of claim 1, where the plurality of void regions form icon shapes in the liquid crystal material during an operation of the liquid crystal display device.

8. The liquid crystal display device of claim 1, where the liquid crystal display device is configured for use in a mobile phone, a PDA, or a mobile computer.

9. A method that forms a liquid crystal display device, the method comprising:
   forming a common electrode layer proximate a liquid crystal material layer;
   patterning a metal oxide layer opposite the common electrode layer, where the liquid crystal material layer is arranged between the common electrode layer and the patterned metal oxide layer;
   applying a thin, optically clear dielectric insulating coating to a surface of the patterned metal oxide layer;
   patterning a metal oxide mask on a surface of the optically clear dielectric insulating coating; and
   electrically shorting the patterned metal oxide mask with the common electrode layer.

10. The method of claim 9, where patterning the metal oxide layer comprises patterning an indium tin oxide layer.

11. The method of claim 9, further comprising coupling a rear substrate with the patterned metal oxide layer, and coupling a front substrate with the common electrode layer.

12. The method of claim 11, where electrically shorting the patterned metal oxide mask with the common electrode occurs during laser cutting of the rear substrate and the front substrate.

13. The method of claim 9, where patterning the metal oxide mask comprises forming a plurality of void regions within which the liquid crystal material shutters substantially during an operation of the liquid crystal display device.

14. The method of claim 13, where forming the plurality of void regions comprises forming icon shapes to display during the operation of the liquid crystal display device.

15. The method of claim 9, where applying the thin, optically clear dielectric insulating coating comprises applying an insulating coating with an index of refraction substantially similar to an index of refraction of indium tin oxide.

16. A liquid crystal display, comprising:
   a liquid crystal material layer;
   a common electrode layer proximate the liquid crystal material layer;
   a patterned metal oxide layer arranged opposite the common electrode layer, where the liquid crystal material layer is arranged between the common electrode layer and the patterned metal oxide layer;
   a thin, optically clear dielectric insulating coating applied to a surface of the patterned metal oxide layer;
   a patterned metal oxide mask applied to a surface of the optically clear dielectric insulating coating, where the patterned metal oxide mask is electrically shorted to the common electrode layer; and
   a display driver operable to supply display signals to the patterned metal oxide layer and the common electrode layer.

17. The liquid crystal display of claim 16, where the patterned metal oxide layer comprises an indium tin oxide layer.

18. The liquid crystal display of claim 16, where the optically clear dielectric insulating coating has an index of refraction substantially similar to an index of refraction of indium tin oxide.

19. The liquid crystal display of claim 16, further comprising a rear substrate coupled with the patterned metal oxide layer, and a front substrate coupled with the common electrode layer.

20. The liquid crystal display of claim 19, where the rear substrate and the front substrate comprise polyethylene terephthalate.

21. The liquid crystal display device of claim 19, where the patterned metal oxide mask is electrically shorted to the common electrode between the rear substrate and the front substrate.

22. The liquid crystal display device of claim 16, where the patterned metal oxide mask comprises a plurality of void regions within which the liquid crystal material shutters substantially during an operation of the liquid crystal display.

23. The liquid crystal display device of claim 22, where the plurality of void regions form icon shapes in the liquid crystal material during the operation of the liquid crystal display.

24. The liquid crystal display device of claim 16, where the liquid crystal display is configured for use in a mobile phone, a PDA, or a mobile computer.

* * * * *